US 11,854,011 B1

United States Patent
Prasad et al.

(10) Patent No.: US 11,854,011 B1
(45) Date of Patent: Dec. 26, 2023

(54) IDENTITY MANAGEMENT FRAMEWORK

(71) Applicant: United Services Automobile Association (USAA), San Antonio, TX (US)

(72) Inventors: Bharat Prasad, San Antonio, TX (US); Minya Liang, Redmond, WA (US); Snehal Desai, Richardson, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 285 days.

(21) Appl. No.: 15/647,015

(22) Filed: Jul. 11, 2017

Related U.S. Application Data

(60) Provisional application No. 62/463,824, filed on Feb. 27, 2017, provisional application No. 62/360,842, filed on Jul. 11, 2016.

(51) Int. Cl.
*G06Q 20/40* (2012.01)
*G06Q 20/38* (2012.01)
*H04L 9/06* (2006.01)
*H04L 9/32* (2006.01)

(52) U.S. Cl.
CPC ... *G06Q 20/40145* (2013.01); *G06Q 20/3829* (2013.01); *H04L 9/0637* (2013.01); *H04L 9/3231* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 8,332,329 B1* | 12/2012 | Thiele | G06Q 20/3221 705/64 |
| 8,826,444 B1* | 9/2014 | Kalle | H04N 21/25816 709/223 |
| 8,843,997 B1* | 9/2014 | Hare | H04L 63/0815 709/200 |
| 9,361,439 B1* | 6/2016 | Bauchspies | G06F 21/31 |
| 9,569,771 B2 | 2/2017 | Lesavich et al. | |
| 9,722,790 B2 | 8/2017 | Ebrahimi | |
| 9,774,578 B1 | 9/2017 | Ateniese et al. | |

(Continued)

FOREIGN PATENT DOCUMENTS

| | | |
|---|---|---|
| AU | 2016101183 A4 | 9/2016 |
| CN | 105681301 A | 6/2016 |

(Continued)

OTHER PUBLICATIONS

Androulaki, E., "A Privacy Preserving ECommerce Oriented Identity Management Architecture", Columbia University, 2011. (Year: 2011).*

Primary Examiner — Neha Patel
Assistant Examiner — Clay C Lee
(74) Attorney, Agent, or Firm — Fletcher Yoder P.C.

(57) ABSTRACT

Techniques are described for using an identity management system. One of the methods includes providing access to a decentralized identity management system to a user. The method includes storing user identity information on the decentralized identity management system. The method includes enabling one or more other users to store reputation information associated with the user identity. The method also includes using the reputation information in a transaction with the user.

20 Claims, 14 Drawing Sheets

(56) References Cited

U.S. PATENT DOCUMENTS

| | | | |
|---|---|---|---|
| 2009/0210328 A1 | 8/2009 | Fomenko et al. | |
| 2009/0248623 A1* | 10/2009 | Adelman | H04L 51/12 |
| 2010/0115610 A1* | 5/2010 | Tredoux | G06F 21/316 726/19 |
| 2011/0258119 A1* | 10/2011 | Al | G06Q 20/40 705/44 |
| 2012/0191621 A1* | 7/2012 | Williams | H04L 63/18 705/325 |
| 2012/0290950 A1* | 11/2012 | Rapaport | G06Q 10/10 715/753 |
| 2014/0172708 A1* | 6/2014 | Chrapko | G06Q 50/01 705/44 |
| 2014/0258107 A1* | 9/2014 | Grigg | G06Q 20/327 705/41 |
| 2015/0128240 A1* | 5/2015 | Richards | H04L 63/0861 726/7 |
| 2015/0278820 A1 | 10/2015 | Meadows | |
| 2015/0310444 A1* | 10/2015 | Chen | G06Q 20/308 705/44 |
| 2015/0332395 A1 | 11/2015 | Walker et al. | |
| 2015/0356524 A1 | 12/2015 | Pennanen | |
| 2015/0356555 A1 | 12/2015 | Pennanen | |
| 2015/0371224 A1 | 12/2015 | Lingappa | |
| 2015/0379510 A1 | 12/2015 | Smith | |
| 2016/0071110 A1* | 3/2016 | Lazay | G06Q 20/10 705/44 |
| 2016/0162897 A1* | 6/2016 | Feeney | G06Q 20/065 705/71 |
| 2016/0203477 A1 | 7/2016 | Yang et al. | |
| 2016/0210626 A1 | 7/2016 | Ortiz et al. | |
| 2016/0261411 A1 | 9/2016 | Yau et al. | |
| 2016/0321751 A1 | 11/2016 | Creighton, IV et al. | |
| 2016/0330027 A1 | 11/2016 | Ebrahimi | |
| 2016/0358165 A1 | 12/2016 | Maxwell | |
| 2016/0365978 A1 | 12/2016 | Ganesan et al. | |
| 2016/0371771 A1 | 12/2016 | Serrano et al. | |
| 2017/0046664 A1 | 2/2017 | Haldenby et al. | |
| 2017/0046799 A1 | 2/2017 | Chan et al. | |
| 2017/0053249 A1 | 2/2017 | Tunnell et al. | |
| 2017/0076280 A1 | 3/2017 | Castinado et al. | |
| 2017/0076286 A1 | 3/2017 | Castinado et al. | |
| 2017/0076306 A1 | 3/2017 | Snider et al. | |
| 2017/0078299 A1 | 3/2017 | Castinado et al. | |
| 2017/0103391 A1 | 4/2017 | Wilson, Jr. et al. | |
| 2017/0109748 A1 | 4/2017 | Kote | |
| 2017/0134161 A1 | 5/2017 | Goeringer et al. | |
| 2017/0140375 A1 | 5/2017 | Kunstel | |
| 2017/0140394 A1* | 5/2017 | Cao | G06Q 30/0201 |
| 2017/0177898 A1 | 6/2017 | Dillenberger | |
| 2017/0206382 A1 | 7/2017 | De Castro et al. | |
| 2017/0221029 A1 | 8/2017 | Lund et al. | |
| 2017/0228371 A1 | 8/2017 | Seger, II | |
| 2017/0228704 A1 | 8/2017 | Zhou et al. | |
| 2017/0228734 A1 | 8/2017 | Kurian | |
| 2017/0230375 A1 | 8/2017 | Kurian | |
| 2017/0232300 A1 | 8/2017 | Tran et al. | |
| 2017/0236123 A1 | 8/2017 | Ali et al. | |
| 2017/0237554 A1 | 8/2017 | Jacobs et al. | |
| 2017/0243208 A1 | 8/2017 | Kurian et al. | |
| 2017/0244707 A1 | 8/2017 | Johnsrud et al. | |
| 2017/0250972 A1 | 8/2017 | Ronda et al. | |
| 2017/0270527 A1 | 9/2017 | Rampton | |
| 2017/0278186 A1 | 9/2017 | Creighton, IV et al. | |
| 2017/0279783 A1 | 9/2017 | Milazzo et al. | |
| 2017/0279801 A1 | 9/2017 | Andrade | |
| 2017/0286717 A1 | 10/2017 | Khi et al. | |
| 2017/0287068 A1 | 10/2017 | Nugent | |
| 2017/0289111 A1 | 10/2017 | Voell et al. | |

FOREIGN PATENT DOCUMENTS

| | | | |
|---|---|---|---|
| CN | 106097101 A | 11/2016 | |
| CN | 106228446 A | 12/2016 | |
| CN | 106230808 A | 12/2016 | |
| CN | 106230852 A | 12/2016 | |
| CN | 106339875 A | 1/2017 | |
| CN | 106355488 A | 1/2017 | |
| CN | 106408299 A | 2/2017 | |
| CN | 106452785 A | 2/2017 | |
| CN | 106453415 A | 2/2017 | |
| CN | 106484836 A | 3/2017 | |
| CN | 106485167 A | 3/2017 | |
| CN | 106504091 A | 3/2017 | |
| CN | 106530083 A | 3/2017 | |
| CN | 106790431 A | 5/2017 | |
| GB | 2541040 A * | 2/2017 | G06F 16/256 |
| KR | 101590076 B1 | 2/2016 | |
| KR | 101591244 B1 | 2/2016 | |
| KR | 20160150278 A | 12/2016 | |
| KR | 101762245 B1 | 7/2017 | |
| KR | 101773073 B1 | 8/2017 | |
| KR | 101773074 B1 | 8/2017 | |
| KR | 101780636 B1 | 9/2017 | |
| WO | 2015085393 A1 | 6/2015 | |
| WO | 2016036969 A1 | 3/2016 | |
| WO | 2016154001 A1 | 9/2016 | |
| WO | 2017006134 A1 | 1/2017 | |
| WO | 2017006135 A1 | 1/2017 | |
| WO | 2017006136 A1 | 1/2017 | |
| WO | 2017021154 A1 | 2/2017 | |
| WO | 2017027648 A1 | 2/2017 | |
| WO | 2017044554 A1 | 3/2017 | |
| WO | 2017065389 A1 | 4/2017 | |
| WO | 2017066715 A1 | 4/2017 | |
| WO | 2017079795 A1 | 5/2017 | |
| WO | 2017091530 A1 | 6/2017 | |
| WO | 2017095036 A1 | 6/2017 | |
| WO | 2017104899 A1 | 6/2017 | |
| WO | 2017119564 A1 | 7/2017 | |
| WO | 2017136956 A1 | 8/2017 | |
| WO | 2017139688 A1 | 8/2017 | |
| WO | 2017146333 A1 | 8/2017 | |

* cited by examiner

IDENTITY MANAGEMENT FRAMEWORK

CROSS-REFERENCE TO RELATED APPLICATIONS

This application claims priority to U.S. Application Ser. No. 62/360,842, filed on Jul. 11, 2016, incorporated herein by reference in its entirety, and U.S. Application Ser. No. 62/463,824, filed on Feb. 27, 2017, incorporated herein by reference in its entirety.

BACKGROUND

Identity management is a broad technology area that deals with identifying individuals in a system (such as a country, a network, or an enterprise) and controlling access to resources within that system by associating user rights and restrictions with the established identity.

Reputation management is the practice of attempting to shape public perception of a person or organization by influencing online information about that entity.

In blockchain environments, such as BitCoin, anyone can claim ownership of an address by signing a message that includes the address. For example, a person can register an address with BitCoin and use that address for sending or receiving money. The address can also be used to sign messages. Thus, the "identity verification" currently performed in blockchain environments may only prove that an individual has access to an address, and may not actually verify the identity of the individual using the address. BitCoin and other blockchain environment currently do not have any trusted method of associating an identity with an address.

SUMMARY

Implementations of the present disclosure are generally directed to identity management.

In general, innovative aspects of the subject matter described in this specification can be embodied in methods that include acts providing access to a decentralized identity management system to a user. The methods include— the act of storing user identity information on the decentralized identity management system. The methods include— the act of enabling one or more other users to store reputation information associated with the user identity. The methods also include the act of using the reputation information in a transaction with the user.

Implementations can optionally include one or more of the following features: The methods may include the act of providing access to the decentralized identity management system includes using biometric information of a user to authenticate the user. The methods may include the acts of verifying the identity of the user including in person verification of the user by a trusted entity. The methods may include the act of sharing the verified identity information with an institution. The transaction may include for example, during a mobile check deposit transaction, determining a period of time between when a check is presented by the user and when the funds are made available to the user. The methods may include the act of storing transaction information about the user. The methods may include the act of determining a pattern of normalcy of transactions. The methods may include the act of detecting a disruption in the pattern. The methods may include the act of alerting an institution of potential fraud. The reputation information may include at least one of degrees earned, a record of military service, and a job history. The transactions may include storing the identity of the user, a check identifier, and a time the check was presented for deposit in a block chain for subsequent reference. The transaction may include receiving a check for deposit, determining, based on a record stored in a block chain, whether the check has been previously presented to a financial institution, and in response to determining the check has been previously presented, rejecting the deposit or putting a hold on the deposit.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features by the present disclosure can include any combination of the aspects and features described herein. That is, aspects and features by the present disclosure are not limited to the combinations of aspects, and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure describes uses of a decentralized identity management system. Identity management is a broad technology area that deals with identifying individuals in a system (such as a country, a network, or an enterprise) and controlling access to resources within that system by associating user rights and restrictions with the established identity.

In general, a decentralized identify system maintains identity information for users. The identity information can be under individual control, can be secure, and can be portable. Individual user's can control their own identity information. Users can add information to their identity information, or ask other individuals or institutions to add information to it. The identity may include claims, disclosures, and proofs. For example, a user may create an identity and then request that a university issue a cryptographically signed claim that the user has a degree from that university. Similarly, the identity management system may store claims that the user works for an organization, is a member of the military, is disabled, is a veteran, etc.

A user's identity information may be protected using public key/private key encryption techniques. In some implementations, some information about a user may be publicly available; other information about the user may be private and can only be shared by the owner of the information. Publicly available information can be protected using encryption.

Some of the features that can be provided by the identity management system includes access to blockchain or identity management account from a mobile app, an embedded app or a web app. The identity management system can securely store identity attributes on blockchain. The identity management system can store identity attributes/reputation scores owned/issued by different authorities. The owner of an identity can selectively share attributes with another party. Limit transactions with a subset of accounts/identities only. The system can associate the blockchain identity to real physical identity. The system can provide account recovery capabilities.

Figure 1:
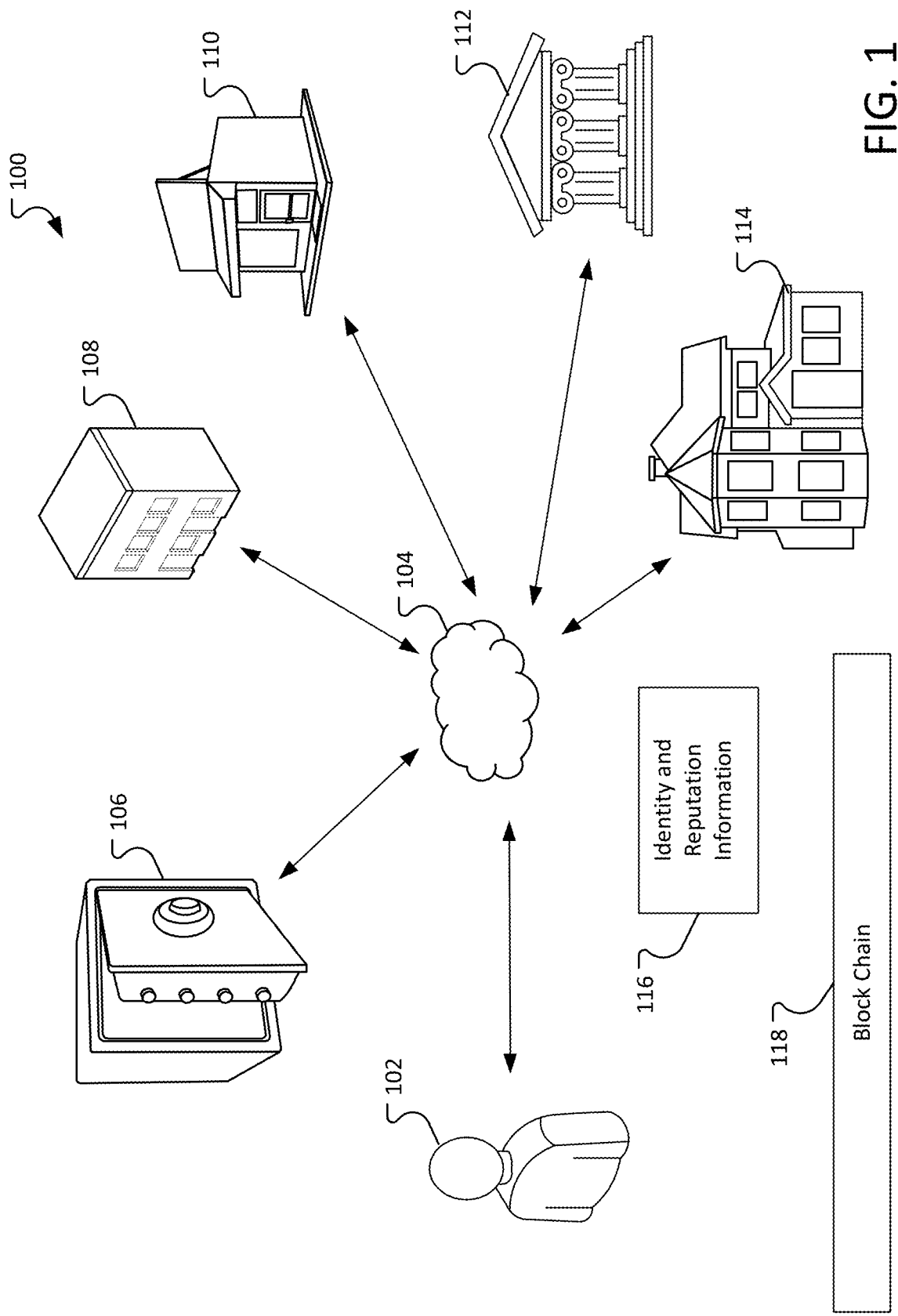
FIG. 1. illustrates and an example environment in which the distributed identity management system can operate.

FIG. 1. illustrates an example environment 100 in which the distributed identity management system 104 can operate. A user 102 may have his identity managed by an identity management system 104. The identity management system 104 can provide identification services to a large number of different organizations. For example the identity management system 104 can verify the user's 102 identity to a cloud storage system 106, companies and institutions 108, merchants and retailer 110, financial institutions 112, and Internet of Things (IoT) devices 114 (generally, the IoT devices refer to the interconnection via the Internet of computing devices embedded in physical devices, enabling them to send and receive data. Examples of these devices, include, but are not limited to, Internet connected locks, refrigerators, thermostats, home security systems, etc).

The identity management system 104 may authenticate the user 102 and then provide information about the user to various counterparties. In some scenarios, the identity information provided to the counterparty may be specifically tailored for that counterparty or for all counterparties of the same or similar type (for example, one set of information about the user 102 may be provided to all financial institutions while a different set of information about the user 102 may be provided to retailers.) In other implementations, the user may create an identity by combining different attributes about the user.

The identity management system 104 can maintain identity and reputation information 116 on behalf of the user 102 (and other users, not shown). The identity and reputation information 116 may be stored, for example, in a distributed ledger such as a block chain 118.

A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain. The block chain may also be a hybrid of public and private block chains. For example, the identity management system may utilize a privately managed, but publicly readable block chain. In this manner, some identity information about a user may be stored in a sidechain.

The identity management system can store multiple different reputation scores. The scores can include a banking reliability score that can be based on bill payment history, credit card balances, savings/overdraft balances, spending patterns (binge spending indicators), bankruptcy filings, and income data. A financial institution may use the information to determine whether or not to provide credit and/or cash advances to a user.

Figure 2:
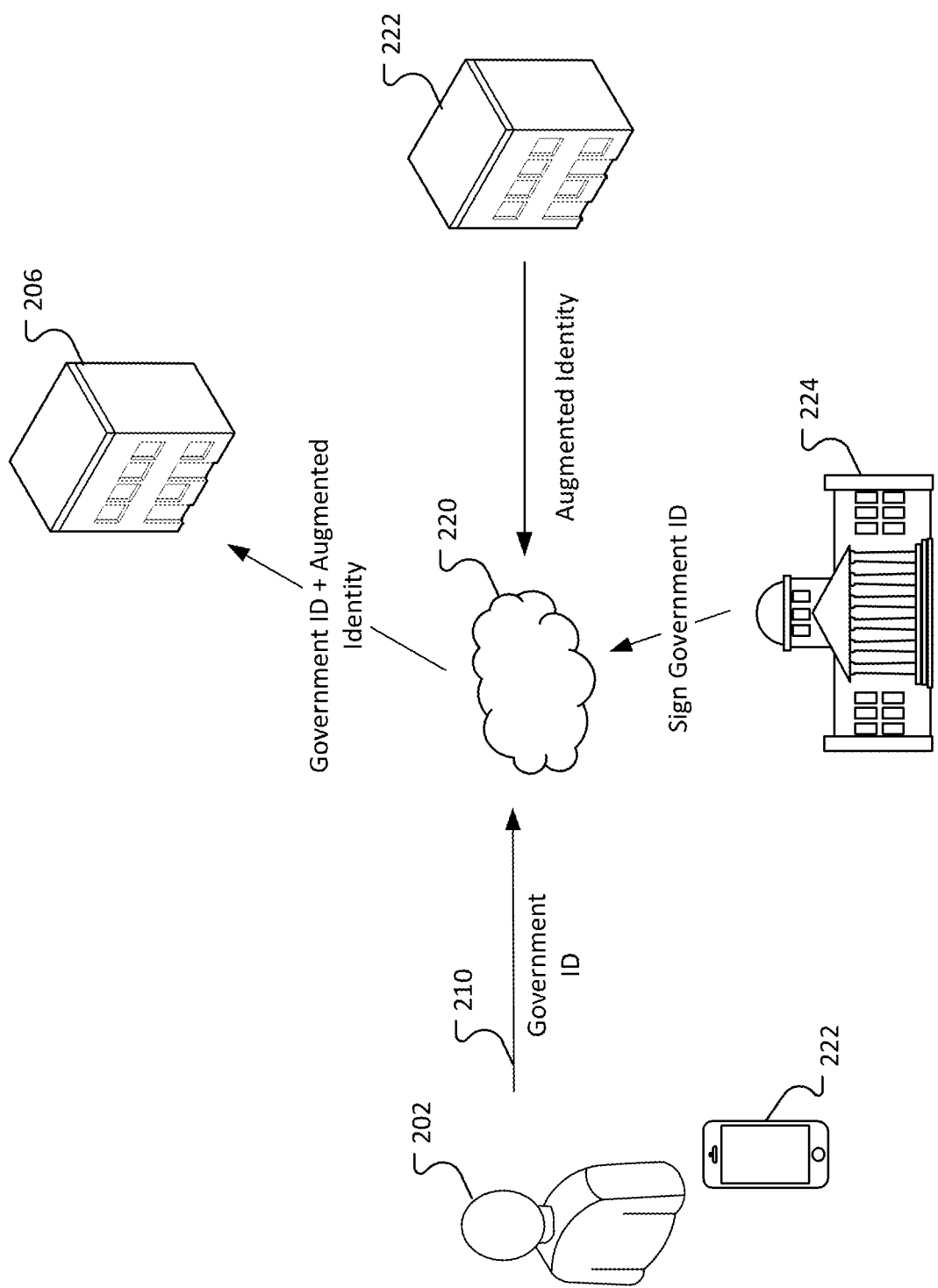
FIG. 2 illustrates an example of verifying a user identification and sharing information about the user between different institutions using an identity management system.

FIG. 2 illustrates an example of verifying a user identity and sharing information about the user between different institutions using an identity management system 220. A user 202 may create a claim associated with their government identification. The claim may be verified or digitally signed by a government institution. The act of verifying an identification may take place in person. For example, the user may need to appear in person at a government institution 224 to have their identification verified. In this manner, the risk of fraud or identity misappropriation may be reduced. The signed identification may be presented digitally to an institution in order to prove that the user is who they claim to be. The institution 222 may gather additional information about the user 202. This augmented identity information may be stored in the identity management system 220. Another financial institution 206 when attempting to verify the identity of the customer 202 may use the government and augmented identity information. This can provide a substantial savings in time and computational effort because the work performed by the financial institution 222 does not have be replicated by the subsequent financial institution 206.

Figure 3:
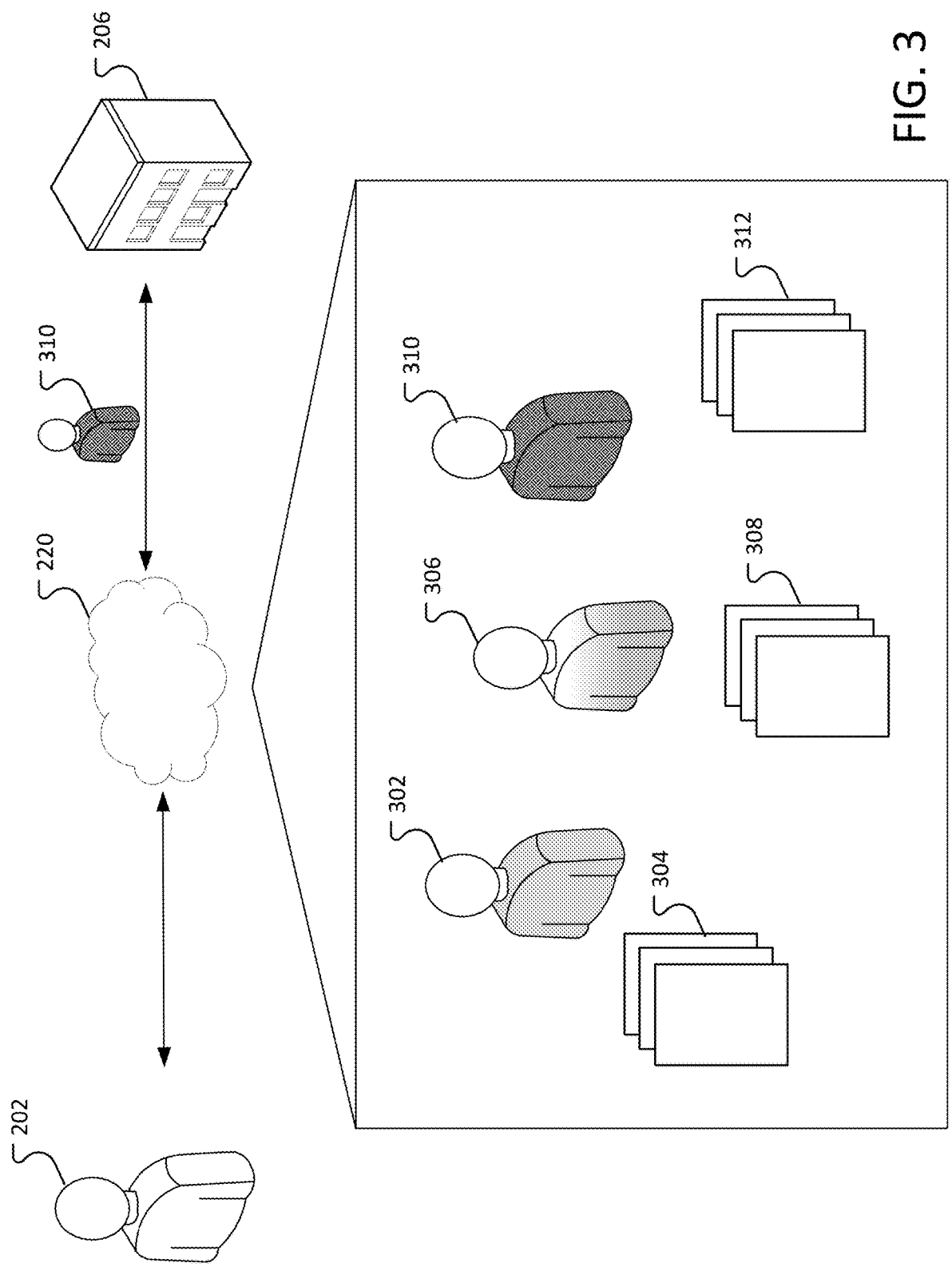
FIG. 3 illustrates an example of the user selecting between different identity profiles to provide to the institution.

FIG. 3 illustrates an example of the user 202 selecting between different identity profiles to provide to the institution 206. In some implementations, when the user logs in to the identity management system they may be able to select between different identity profiles which determine the kinds of information that is provided to the counterparty. In this example, the user 202 has three different identity profiles (identity profile 302 associated with identity information 304, identity profile 306 associated with identity information 308, and identity profile 310 associated with profile information 312).

The identity profiles may be displayed to the user, for example on a user interface of the client's device. The user may select between the different identity profiles to determine which identity profile is provided to the institution 206. In this example, the user 202 has selected the identity profile 310 to provide to the institution 206. In this manner, the user 202 may limit the kinds of information that can be received by the institution 206.

In some implementations, a default identity profile may be selected automatically by the identity management system 220 based on the counterparty. For example, financial institutions may receive one identity profile, while merchants may receive a different identity profile. In some implementations, the user 202 may be able to specify all the identity information that is provided to the counterparty. In some implementations, some of the information provided to the counterparty may be provided based on the type of the counterparty or the context in which the counterparty request information. For example, a counterparty may request specific reputation-related information about the user 202, which may be provided by default.

Figure 4:
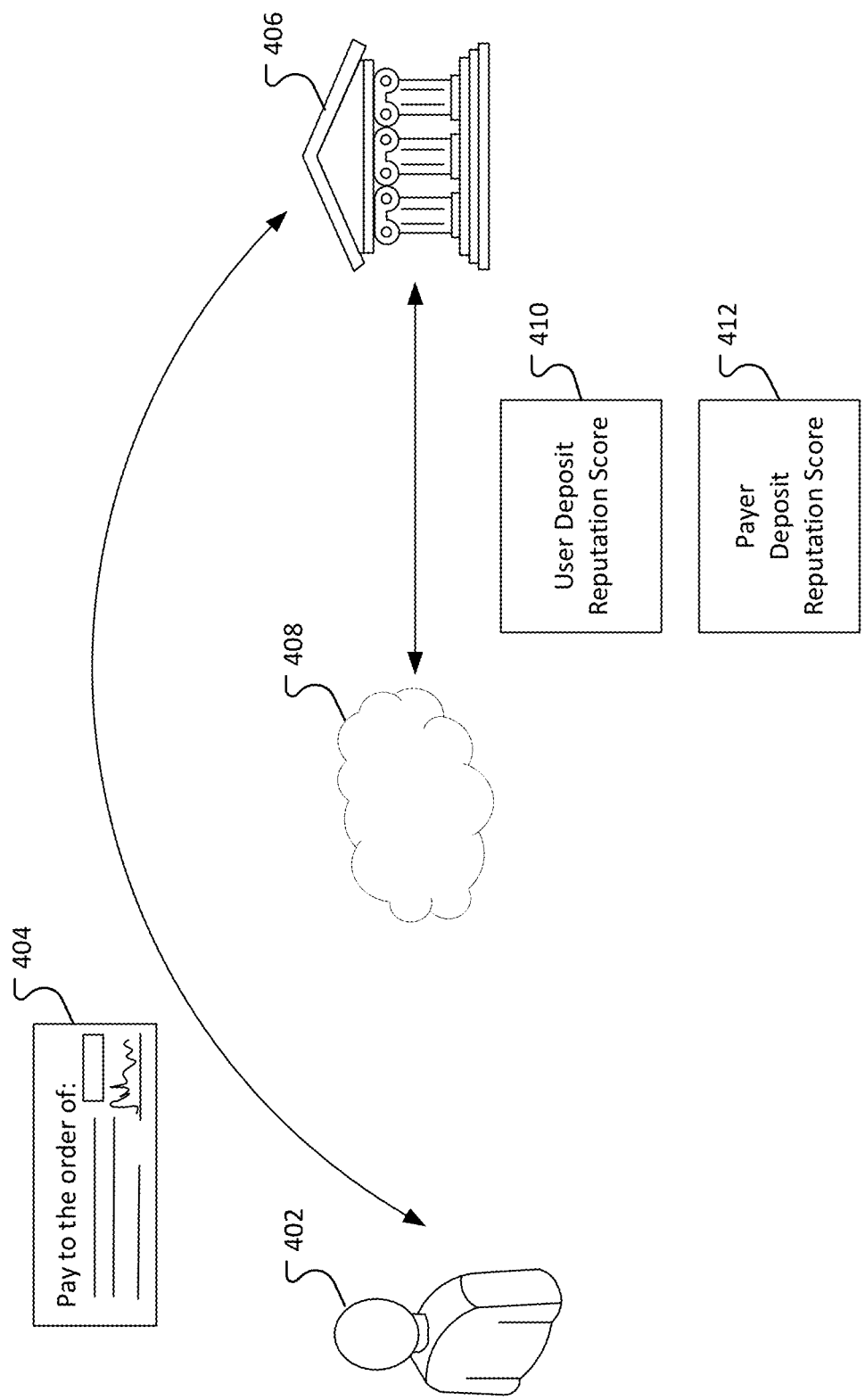
FIG. 4 illustrates an example in which an institution may request reputation information about a user.

FIG. 4 illustrates an example in which an institution may request reputation information about a user. In this example, a user 402 presents a check 404 to a bank 406. The user 402 authenticates with the identity management system 408. As part of the information provided by the identity management system 408 there may be a user deposit reputation score 410. The user deposit reputation score 410 is indicative of how likely it is that the check 404 presented by the user 402 is valid. The user deposit reputation score 410 may be provided as part of the identity information the identity management system 408 provides about the user 402 or may be requested separately by the bank 406. In some implementations, the bank 406 may also receive reputation information about the individual payer who wrote the check 412.

The user deposit reputation score 410 may be determined based on user account behavior such as the average daily balance maintained by the user, the number of returned checks in the last 30 days, the number of overdrafts in the last 12 months, and the age of the oldest transactional deposit account.

Based on the users deposit reputation score 410, the bank 406 may elect to make the deposited funds immediately available for withdrawal or may determine to hold the deposit until the check has cleared.

Figure 5:
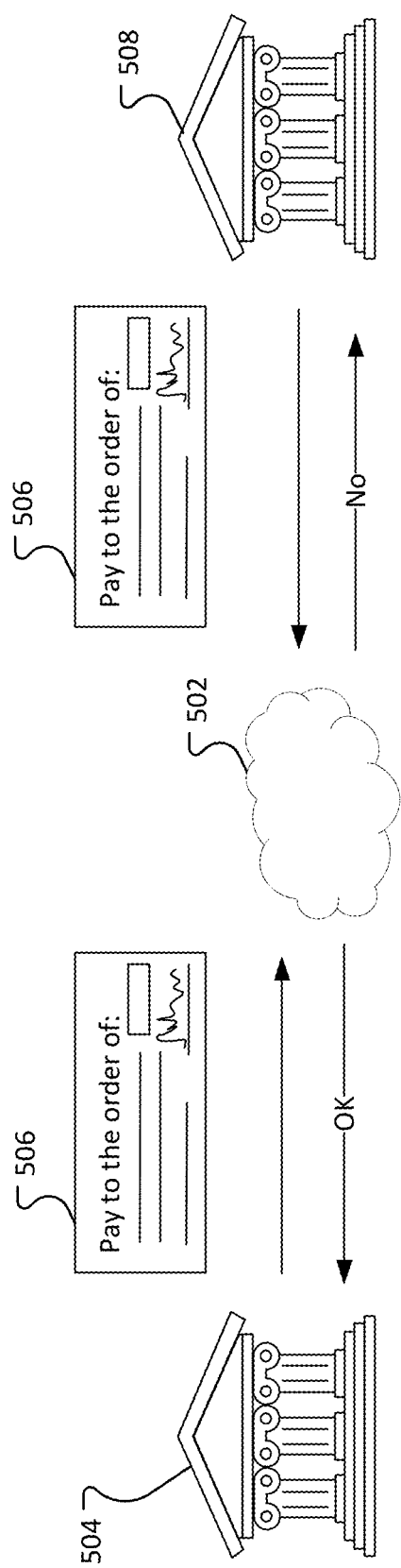
FIG. 5 illustrates an example of how an identity management system can help prevent fraud.

FIG. 5 illustrates an example of how an identity management system can help prevent fraud. For example, remote deposit application offered by several banking institutions and has a risk that a check may be represented within the same bank or across multiple banks. An identity management system can help mitigate this risk.

In this example, a user (not shown) has presented a check 506 to a bank 504. The check may be presented, for example, using a mobile deposit application on a smart device.

The bank 504 sends the check information to the identity management system 502 (for example, in conjunction with receiving the user deposit reputation score, as described above). The check information may include, for example, the routing number, the account number, and the check number.

The identity management system 502 may verify that the identity management system 502 has not previously received a request for the check before, or, alternatively, may check a block chain that records checking transactions to verify that the check has not been previously deposited or cashed.

In this example, the identity management system 502 finds no record of the check and therefore provides information that the check is likely ok.

If, at a later time, another bank 508 presents the same check 506 to the identity management system 506, the identity management system 506 determines that the check 606 has been previously presented and accordingly tells the other bank 508 that the check is likely invalid.

Figure 6:
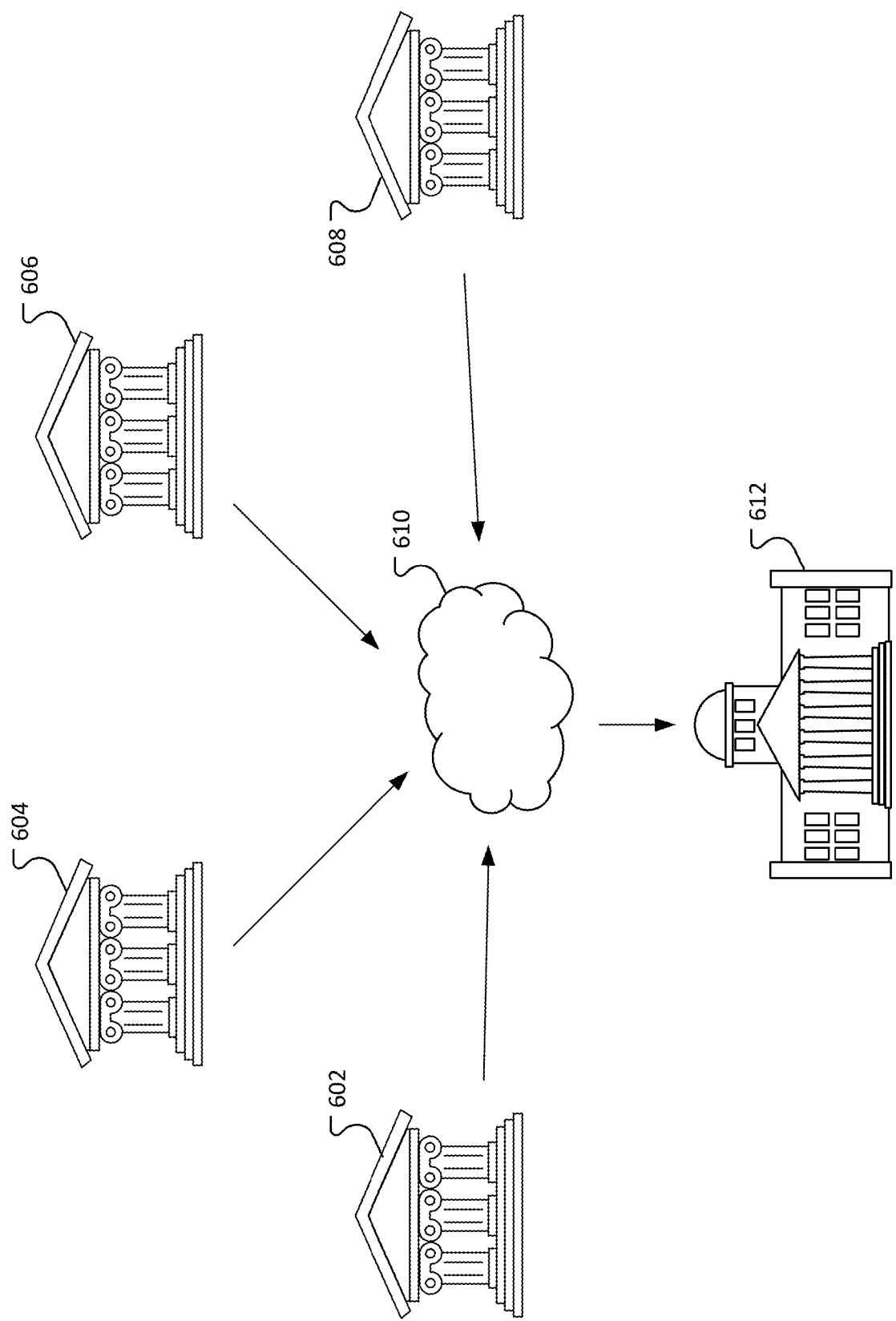
FIG. 6 illustrates an example of how an identity management system may be used to support government regulation and compliance efforts.

FIG. 6 illustrates an example of how an identity management system may be used to support government regulation and compliance efforts. AML (Anti-Money Laundering) are compliance requirements mandating that when onboarding a new customer, a financial intuition needs to gather sufficient proof of the true identity of the customer—an actual physical person, and as an ongoing effort, know the customer's expected activities in order to detect any suspicious activities and money laundering. The manual process of document-gathering and verification is a bottleneck to effective KYC (Know Your Customer)/AML compliance process.

Because a user may have been previously verified by the identity management system, the document-gathering and verification process may be simplified (for example, the documents may be directly available from the identity management system). In some implementations, the know your customer requirements may be met by the identity management system and provided as proof to the financial institution.

Further, anti-money laundering efforts may be assisted by consolidating transaction information across multiple financial institutions (for example, the financial institutions 602, 604, 606, and 608) with the identity management system 610.

The identity management system 610 can then provide compliance or alerts to government 612 or other watchdog groups.

At the same time, information provided to the identity management system 610 can be used to detect patterns in user transactions using transaction information. Actions that diverge from the pattern can be used to detect fraudulent account takeovers.

Another area where a decentralized identity management system may be used is to manage devices, such as Internet-of-Things (IoT) devices. In some implementations, smart contract(s) executing on a distributed ledger of the decentralized identity management system, and/or code running elsewhere, may control access to one or more IoT devices in a home or other environment. The smart contract(s) may employ information stored on the distributed ledger and information in a transaction sent to the smart contract(s) to determine whether particular user(s) and/or process(es) may access the IoT device(s), issue commands to the IoT device(s), access data generated by the IoT device(s), and/or control the IoT device(s). The smart contract(s) may provide a secure portal through which user(s) and/or service(s) may access IoT device(s) for command and control of such device(s), and secure access may be based on permission information that is specified or provided by an owner or operator of the device(s) and that is stored on the distributed ledger. For example, a homeowner may update permission information to indicate that a particular individual is to be given access to an IoT device that is a smart door lock. Based on this permission, the individual may approach the door and, using an application executing on a portable computing device (e.g., smartphone), instruct the lock to disengage and enable the door to be opened. The permission information may specify particular constraints on the access. For example, the individual may be given permission to open the door a single time, or up to N times, or only during a specified period of time (e.g., certain hours of the day, certain days of the week, etc.). Unlike traditional access code based IoT devices, implementations provide access control in which there is no passcode that the user needs to remember, and which can be passed around or snooped. A user has access to the device provided that the user's identity is given access to that device as recorded by the distributed ledger (e.g., in the permission information) and provided that the user successfully authenticates as their identity.

The smart contract(s) may also act as an intermediary to manage communications between the IoT device(s) and external service(s), and/or the smart contract(s) may establish trusted, secure communications with external services on behalf of the IoT device(s). Based on permission information stored on the distributed ledger, the IoT device(s) may interact with external resources and/or services, such as utility services, e-commerce services, and so forth. For example, an IoT device that consumes and/or distribute power, water, gas, and/or other resources may monitor its own status and, on detecting a failure, may automatically communicate with a utility company to inform the company of the failure. As another example, an IoT device may detect a failure of one of its components, and may automatically communicate, through the smart contract(s), with an e-commerce service to order a replacement component. In some instances, such communications may be performed automatically by the IoT device without requiring the intervention of a user.

In some implementations, the smart contract(s) interact with each of the individual IoT devices (e.g., as each is brought online and added to an IoT or other network). The smart contract(s) may determine, for each IoT device, whether a particular device is a trusted and/or secure device such that the device may be added to the network and enabled for command and control. For example, the IoT device may authenticate itself with the smart contract(s), and the smart contract(s) may establish a command-and-control relationship with the IoT device that is mediated through permission information stored on the distributed ledger. Through use of the permission information stored on the distributed ledger, the smart contract(s) can ensure that communication between any trusted IoT device on the local network and external service(s) is secure and limited to authorized individuals or processes. Accordingly, implementations provide and/or enhance the security and trust of an IoT ecosystem, such as a home network.

In some implementations, the smart contract(s) may operate as a payment and/or transaction hub or gateway for the IoT devices, such that transactions between the IoT devices and external service(s) go through the smart contract(s). For example, the smart contract(s) may include a payment component that is configured to access payment information that is securely stored on the distributed ledger. Payment information may be in some form of digital currency used to pay for transactions. Each identity on the blockchain can be represented by an address, and each address may have a balance built-in, and can send and receive digital currency of that blockchain. In some instances, other types of payment information may be employed such as private credit card or bank account information. Such private information is stored off ledger, and the ledger provides secure access to such information. Payment for services or products can be made through the built-in digital currency system, or other payment information. The IoT device may request that the smart contract(s) initiate a transaction with an external service, such as a purchase of a replacement component, payment of utility bill, and so forth. For example, an IoT device may be a lamp or light fixture, or a sensor module that monitors the lamp or light fixture. The IoT device may detect that the bulb in the lamp has burned out, and the IoT device may execute transactions through smart contract(s) to order and pay for a new replacement bulb from an online retailer. In some instances, such transactions may be initiated automatically without requiring user intervention, after an authorized user (e.g., device owner) has initially set up the payment information and authorized the smart contract(s) to automatically perform such transactions.

In some implementations, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to access IoT device(s) and/or constraints on such access. The interface may also enable the user to view information such as IoT device status and/or request history that is stored on the distributed ledger. Request history may provide an auditable history of requests to and from the IoT device(s), which are mediated by the smart contract(s) on the distributed ledger.

In some implementations, the smart contract(s) may enable authorized individuals to control one or more IoT devices, such as mechanisms of the home or other structure. For example, the smart contract(s) may communicate over one or more (e.g., wired or wireless) networks with one or more lock mechanisms for doors in the home. Smart contracts can execute on a P2P network of a pool of computers connected to the internet through a wireless and/or wired connection. Devices (e.g., locks) can connect to this P2P network through a wireless and/or wired connection. The smart contract can be accessed and/or communicated with on the distributed ledger and/or P2P network where it resides. This P2P network can be accessed through one or more networks of any suitable type. The user (e.g., device owner, home owner, etc.) may grant permission to a service person (e.g., plumber, HVAC repair person, etc.) to access the home a particular number of times and/or during a particular period of time, and such permission may be specified in the permission information stored on the distributed ledger. When a service person approaches the door to gain access to the home, the smart contract(s) may receive an indication of the detected presence of the service person in proximity to the door, verify that the service person is authorized for access (based on the permission information), and open the door. In some instances, the detection of the person at the door is an application function that is performed outside the distributed ledger (e.g., driven by cameras installed at the door that notifies a mobile app). Homeowner can initiate a command that causes the execution of the smart contract on the ledger to enable the lock software to open the lock. As another example, a biometric wearable that the service person wears could be automatically verified by an application (e.g., outside the ledger) and the application can initiate a ledger smart contract. In some implementations, the smart contract(s) may also perform other actions, such as provide payment to the service person, coordinate a real-time communication (e.g., video chat) session between the service person and the homeowner, and so forth.

The IoT devices may include, but are not limited to, one or more of the following: smart appliances (e.g., washers, dryers, refrigerators, ovens, dishwashers); home entertainment systems (e.g., televisions, audio systems, game consoles, media players, etc.); in-home control systems (e.g., garage door openers, alarm systems, security systems, smart home systems); lighting devices (e.g., lamps, fixtures, etc.); utility systems that provide and/or control electric power, gas, water, sewage, heating and air conditioning, network access, and so forth, (e.g., water meters, water heaters, gas meters, electrical switch boxes, circuit breaker boxes, etc.); and/or portable or less portable computing devices (e.g., smartphones, tablet computers, electronic book readers, gaming systems, laptop computers, desktop computers, television set-top boxes, in-vehicle automotive computers or telematics devices, etc.).

Figure 7:
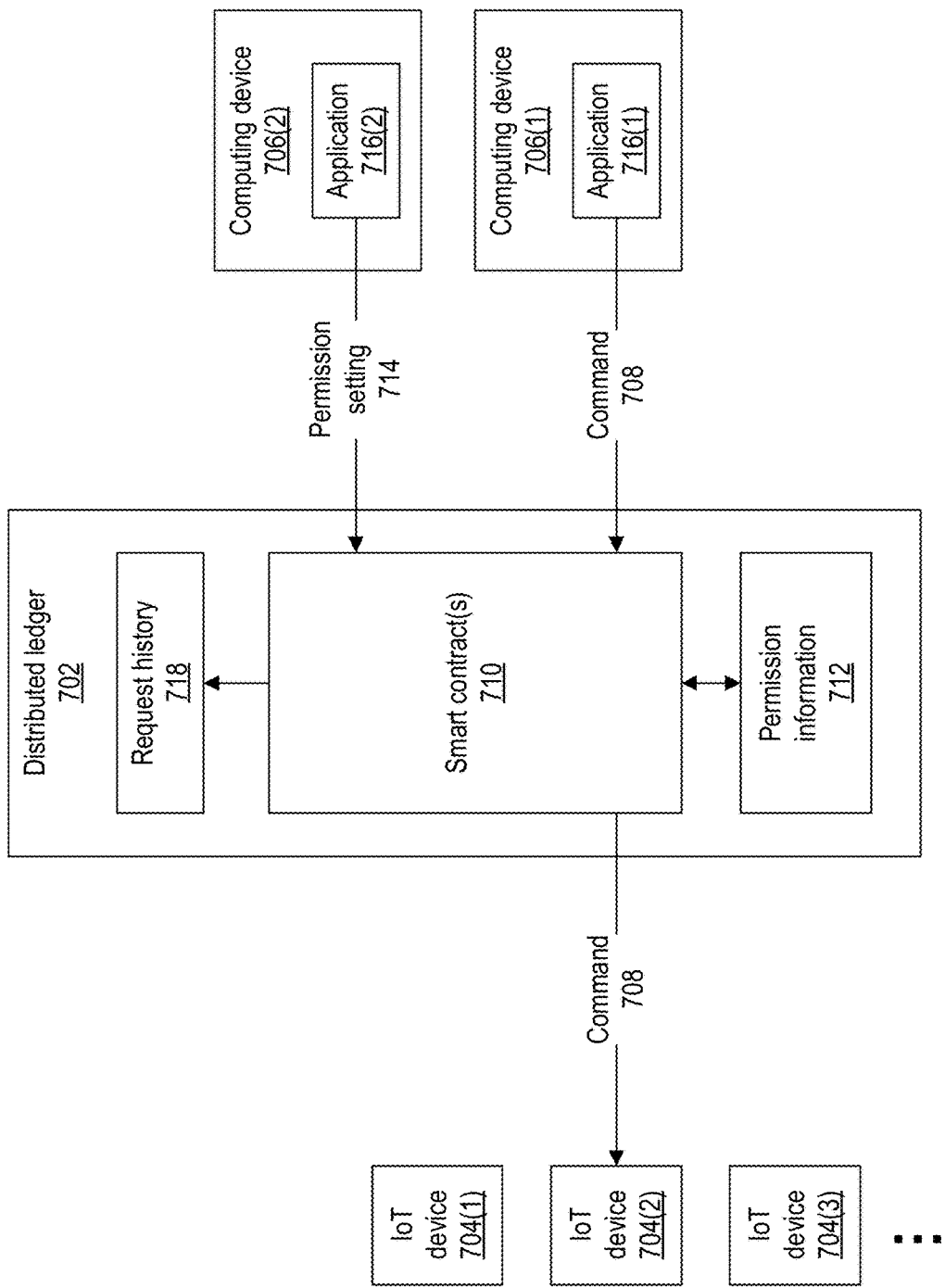
FIG. 7 depicts an example system for device management.

FIG. 7 depicts an example system for device management, according to implementations of the present disclosure. In some implementations, the system includes a distributed ledger 702 of an identity management system. In some instances, the distributed ledger is a blockchain as described above. The distributed ledger 702 may store information on any suitable number of nodes that are distributed across any suitable number of computing device(s). The system also includes a plurality of IoT devices 704, such as IoT devices 704(1), 704(2), and 704(3), as shown. Implementations support the management of any suitable number of IoT device(s) 704. The IoT device(s) may be located in or near a same building, such as a house, office building, and so forth. The IoT device(s) may communicate with one another, and/or with other computing devices, over one or more networks that are wired and/or wireless networks. For example, in some instances the IoT device(s) may communicate over a wireless network that enables radio-frequency communications according to a version of an IEEE 802.11 protocol (e.g., a WiFi network), a version of Bluetooth™ and/or Bluetooth Low Energy (BLE)™ protocol, a Near Field Communication (NFC) protocol, and so forth.

The system may also include various other computing devices 706, such as the computing devices 706(1) and 706(2) as shown. The computing devices 706 may be any suitable type of computing device. In some instances, the computing devices 706 include portable computing devices (e.g., mobile devices), such as a smartphone, tablet computer, wearable computing device (e.g., wristwatch- or glasses-configured computer), and so forth. One or more of the computing devices 706 may execute an application 716. In some instances, the application 716 is a mobile app configured to execute on a portable computing device such as a smartphone.

A user of the computing device 706(1), also described as a user device or requesting user device, may use the application 716(1) to request that a command 708 be sent to a particular IoT device 704. For example, a user may approach a door to a house and request that a command be sent to instruct a IoT door lock mechanism to unlock the door and permit entry to the house. As another example, a user may approach a smart utility controller and request that a command be sent to access data generated by the controller. As another example, a user may approach a vehicle and request that a command be sent to unlock the vehicle door and/or start the engine of the vehicle.

The command 708 may be received by a smart control 710 executing on the distributed ledger 702. The smart contract 710 may access permission information 712 stored on the distributed ledger 702 and, based on the permission information 712, decide whether the forward the command 708 to the target IoT device 704. If the permission information 712 indicates that the user of the requesting device 706, the requesting device itself, and/or the application 716 executing on the requesting device 706 is authorized to send commands to the particular targeted IoT device 704, the command 708 may be forwarded to the IoT device 704. In some instances, the permission information 712 may specify certain constraint(s) governing the access of the requesting device, requesting user, and/or requesting application to the IoT device 704. In such instances, the smart contract 710 may verify that the constraint(s) are satisfied before sending the command 708 onto the IoT device 704.

In some instances, the IoT device 704 may execute the command 708 and provide a response that indicates the result of executing the command 708 (e.g., command success, command failure, and so forth). The result may be communicated back to the requesting device 706 through the smart contract 710, and the result may be presented to the requesting user through a user interface (UI) of the requesting application. In some instances, the forwarding of the command to the IoT device 704, through the smart contract 710, may establish a communications session between the requesting device 706 and the IoT device 704. For example, following the initial verification by the smart contract 710 that the requesting user, device, and/or application are permitted to communicate with the IoT device 704, and/or verification that any relevant constraint(s) are satisfied, the requesting device 706 and IoT device 704 may establish a connection, either directly or through the smart contract as an intermediary, and use the connection to exchange any appropriate number of subsequent communications.

In some implementations, the distributed ledger 702 may store a request history 718 that describes the various commands 708 and/or other communications that may be sent to and/or from IoT devices 704 through the distributed ledger of the identity management system, using the smart contract 710 as an intermediary. The smart contract 710 may update the request history 718 to describe the requests received from computing device(s) 706 to send command(s) 708 to IoT device(s) 704, whether such requests are allowed or denied by the smart contract 710.

In some implementations, a smart contract 710 may be associated with a particular user who is an owner (e.g. stored on in the identity management system as part of the user's identity), or otherwise responsible for, the IoT device(s) 704. In some implementations, the distributed ledger of the identity management system 702 may execute any number of smart contracts 710, each of which is associated with a particular owner of a set of IoT devices 704. An owner may use a computing device 706(2), and/or an application 716(2) executing on the computing device 706(2), to send one or more permission settings 714 to update the permission information 712 for the IoT device(s) 704 that are associated with that owner. The smart contract 710 may receive the permission setting(s) 714, verify whether the owner is authorized to update the permission information 712 and, if so, update the permission information 712 to include the permission setting(s) 714. In this way, an owner of IoT device(s) 704 may control which users are allowed to access which IoT device(s) 704 (e.g., send command(s) to the IoT device(s) 704) and what constraints (if any) are to govern such access.

Figure 8:
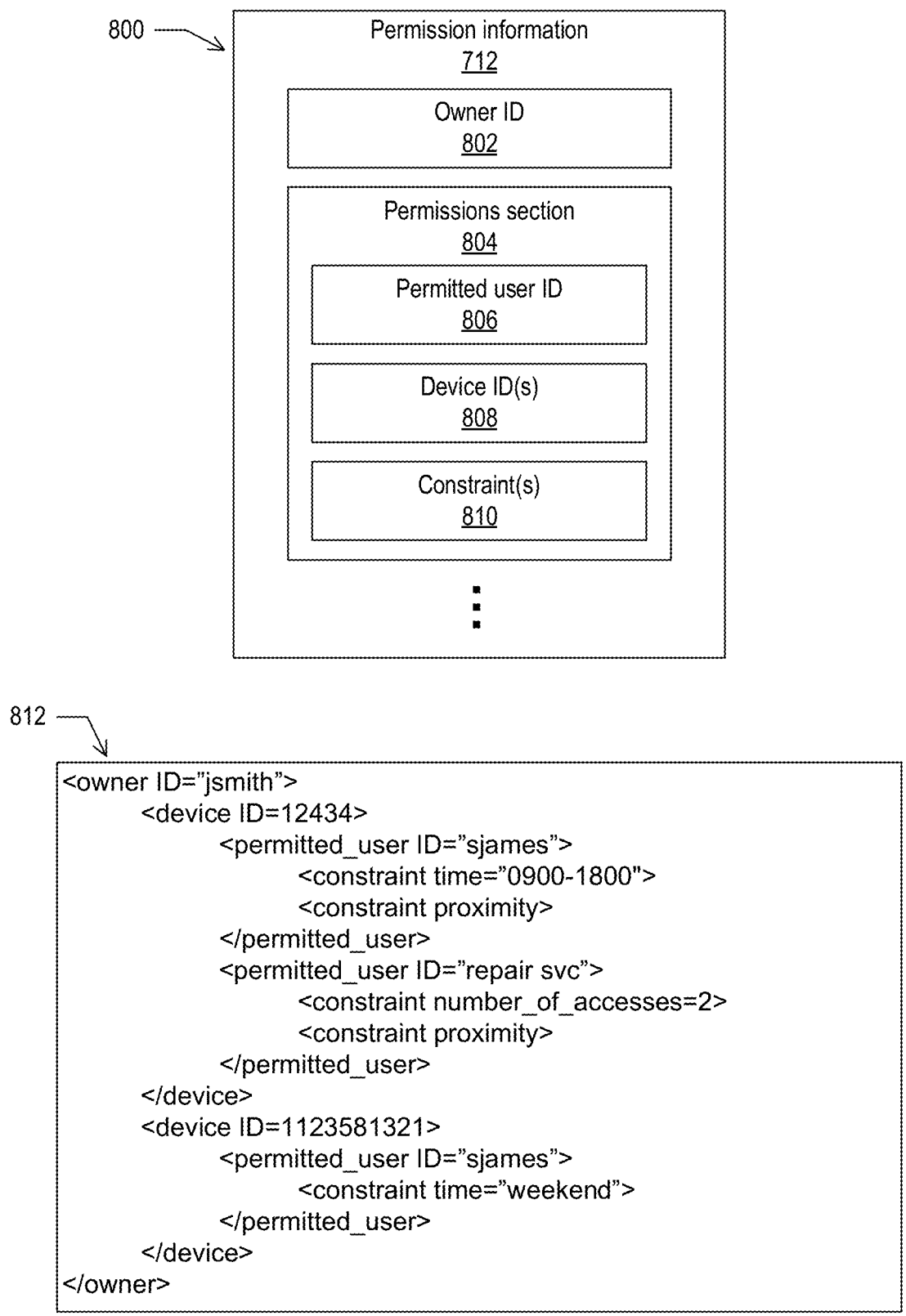
FIG. 8 also depicts a particular example of permission information.

FIG. 8 depicts an example schematic 800 of the permission information 712 for device management, according to implementations of the present disclosure. The permission information 712 may include any suitable number of sets of permission information, with each set of permission information corresponding to a particular owner of a set of IoT devices 704 to be managed. A set of permission information 712 may include an owner identifier (ID) 802 that identifies the owner user. The owner ID 802 may be a username, personal name, identification number, account name, and/or other any suitable ID that uniquely identifies the owner among a population of users.

The permission information 712 may also include any number of sections 804 that each correspond to a user who is permitted to access (e.g., send commands to) one or more of the IoT devices 704 associated with the owner. Each section 804 may include a permitted user ID 806 that identifies the particular permitted user. The permitted user ID 804 may be a username, personal name, identification number, account name, and/or other any suitable ID that uniquely identifies the user among a population of users. The section 804 may also list any suitable number of device IDs 808 that identify the IoT device(s) to which the permitted user is given permission to access. A device ID 808 may be a device name, identification number, network address, media access control (MAC) address, Uniform Resource Identifier (URI), and/or other suitable identifier.

In some instances, one or more of the device ID(s) 808 may be associated, in the section 804, with one or more constraints 810 that govern the access of the permitted user to the particular IoT device 704. As described above, such constraint(s) 810 may include location-based constraints, such as requiring the requesting device to be in proximity to the IoT device 704. Constraint(s) 810 may also include time-based constraints, such as requiring that the request for access be sent within a particular period of time indicated in the constraint (e.g., a particular time of day, particular days of the week or month, a designated range of dates and/or times, and so forth). Constraint(s) 810 may also include constraints on number of requested accesses, such as permitting a particular user to send N commands 708 to a particular IoT device 704, during a particular time period or unconstrained with respect to date/time.

FIG. 8 also depicts a particular example 812 of permission information 712. The example 812 depicts permission information 712 organized in an Extensible Markup Language (XML) format. Implementations also support the use of any other suitable format for the permission information 712.

Figure 9:
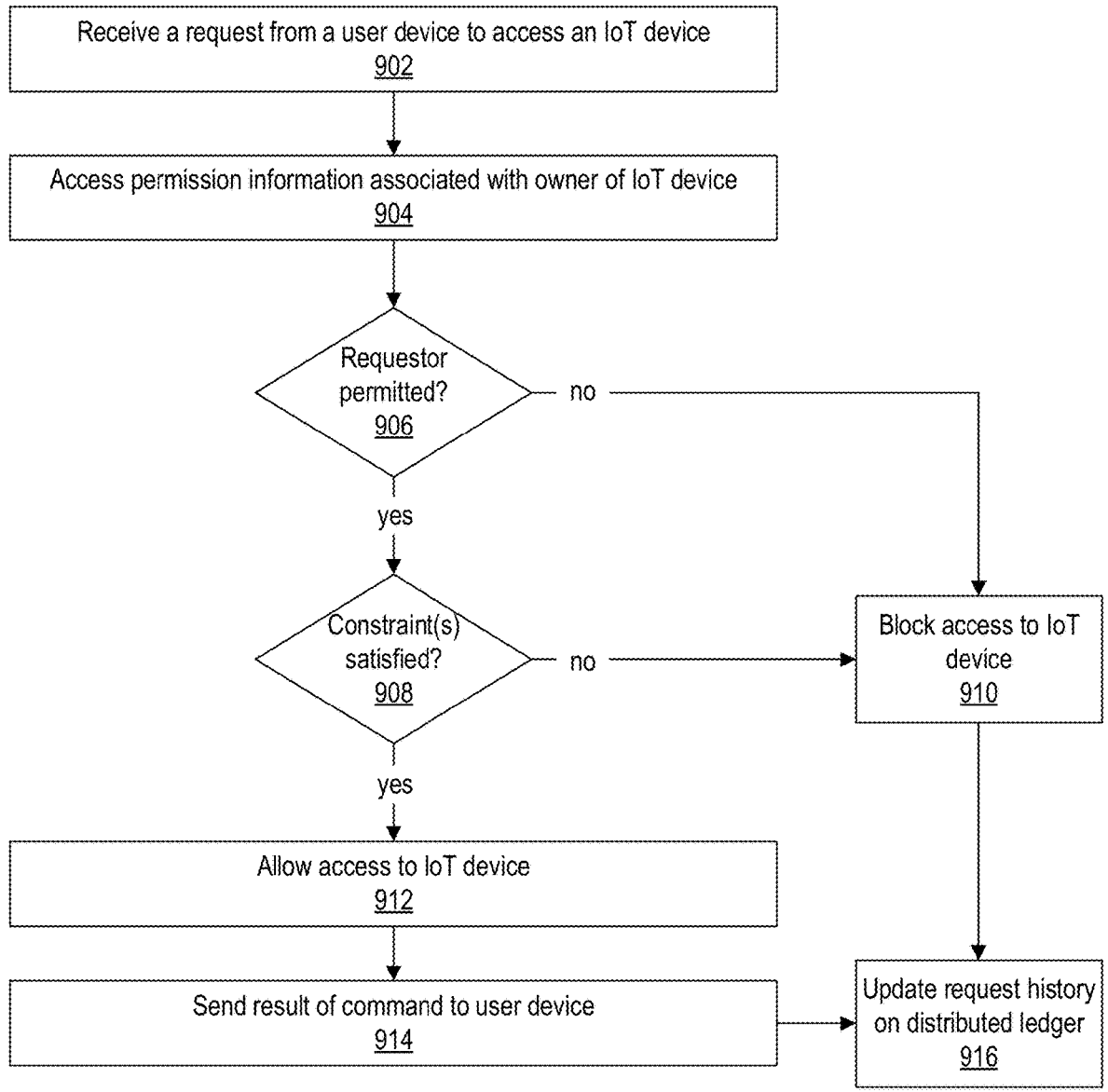
FIG. 9 depicts a flow diagram of an example process for managing commands sent to device(s), according to implementations of the present disclosure

FIG. 9 depicts a flow diagram of an example process for managing commands sent to the device(s) 704, according to implementations of the present disclosure. Operations of the process may be performed by one or more of the smart contract(s) 710, the application(s) 716, and/or other software processes executing on the computing device(s) 706, the IoT device(s) 704, the distributed ledger of the identity management system 702, and/or elsewhere.

A request may be received (902) from a user device 706, requesting to send a command to otherwise access a particular IoT device 704, also described as the target IoT device. As described above, the request may be received through the smart contract 710 that executes on the distributed ledger of the identity management system 702. In some implementations, the request includes an ID of the requesting user, such as a username. In some implementations, both the requesting user and the owner of the IoT device(s) 704 may have previously registered with a device management service, and the user IDs of the requesting user and owner may be issued by the device management service.

The smart contract 710 may access (904) the permission information 712 that is associated with an owner of the target IoT device 704. Based on the permission information 712, a determination is made (906) whether the requestor (e.g., the requesting user) is permitted to access the target IoT device 704, and thus whether the computing device 706(1) of the requesting user is permitted to issue commands to the controlled IoT device(s). In some implementations, determining that the computing device 706(1) is permitted to issue the command to the IoT device is further based on authenticating the user of the device 706(1). Such authentication may use any suitable authentication mode. In some instances, authentication may be based on verifying one or more credentials provided by the requesting user, such as a username, password, personal identification number (PIN), and so forth. In some instances, authentication may be based on a biometric authentication mode, in which biometric data is collected from the requesting user and compared to previously collected biometric data of the user, to verify that the user is who they purport to be. Such biometric data can include, but is not limited to, fingerprint image(s), retinal image(s), image(s) of the user's face or other body portions (e.g., for facial recognition), voice print recognition, data describing the user's heartbeat, pulse, brainwave activity, galvanic skin response, body tremor, gait, electrical impedance, and so forth.

If the requestor is permitted, a determination may be made (908) whether any constraint(s) on the access are satisfied, such as the constraint(s) that govern the particular requesting user's access to the target IoT device 704. If it is determined that the requesting user is not permitted to access the target IoT device 704, or that the constraint(s) on such access are not satisfied, the access may be blocked (910) and the command may not be forwarded to the target IoT device 704. If it is determined that the requesting user is permitted to access the target IoT device 704, and that any constraint(s) on such access are satisfied, the access may be allowed (912) and the command may be forwarded to the target IoT device 704. In either case (blocked or allowed), the smart contract 710 may update (916) the request history 718 on the distributed ledger of the identity management system to indicate whether the requested access was blocked or allowed.

Figure 10:
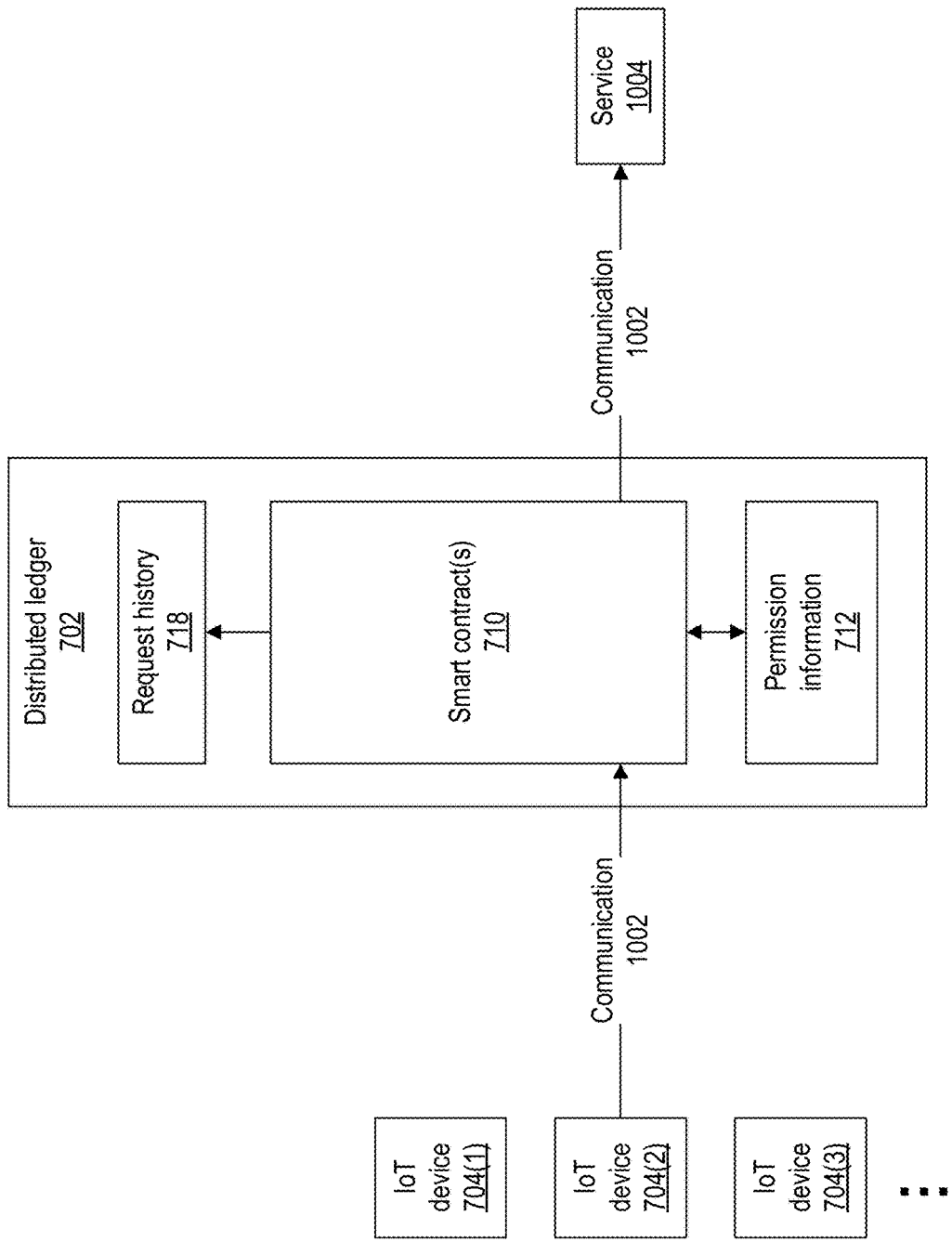
FIG. 10 depicts an example system for device management, according to implementations of the present disclosure

FIG. 10 depicts an example system for device management, according to implementations of the present disclosure. As described above, in some implementations the smart contract(s) 710 may manage outgoing communications sent from the IoT device(s) 704, in addition to or instead of managing incoming commands or other access to the IoT device(s) 704. As shown in the example of FIG. 10, an IoT device 704 may attempt to send a communication 1002 to some external service 1004. In some instances, the communication 1002 may be an attempted transaction, such as a purchase transaction or a request that payment be sent to some external entity. For example, a smart light fixture may determine that its light bulb has burned out and, in response to such a determination, the fixture may automatically attempt to purchase a replacement bulb from an external e-commerce service. The smart contract 710 may receive the communication 1002 and check whether the permission information 712 indicates that the communication 1002 is allowed or disallowed. If the communication 1002 is allowed, the smart contract 710 may transmit the communication 1002 on to its intended destination (e.g., network address of the service 1004). If the communication 1002 is not allowed, the smart contract 710 may block the communication 1002. In either case, the smart contract 710 may update the request history 718 to indicate that the communication 1002 was attempted, and to indicate whether the communication 1002 was allowed or blocked.

Figure 11:
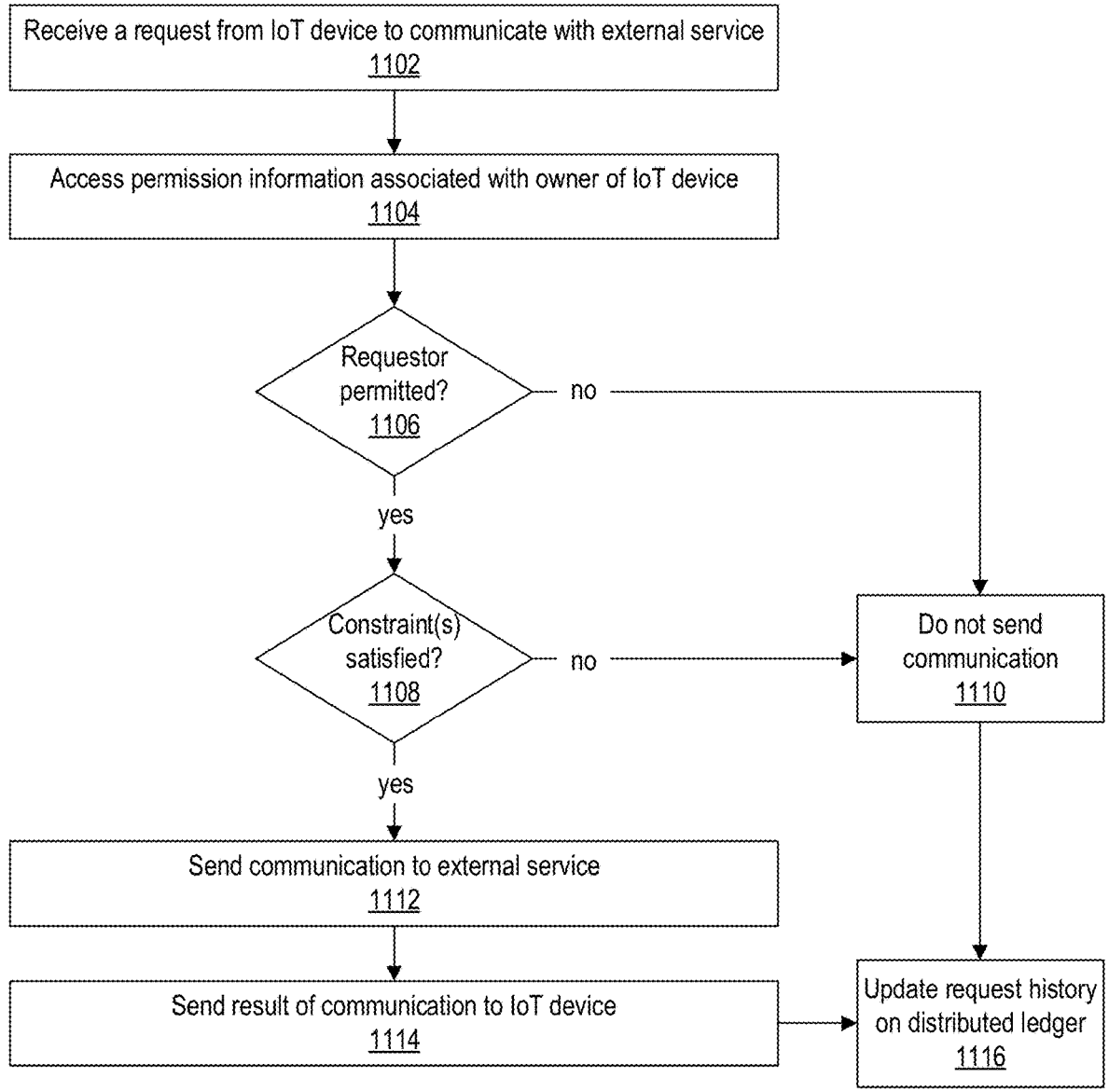
FIG. 11 depicts a flow diagram of an example process for managing communications sent from devices, according to implementations of the present disclosure.

FIG. 11 depicts a flow diagram of an example process for managing communications sent from devices, according to implementations of the present disclosure. Operations of the process may be performed by one or more of the smart contract(s) 710, the application(s) 716, and/or other software processes executing on the computing device(s) 706, the IoT device(s) 704, the distributed ledger of the identity management system 702, and/or elsewhere.

A request may be received (1102) from an IoT device 704, requesting to send a communication to a service 1004 over a network (e.g., the internet). The request may be received through the smart contract 710 that executes on the distributed ledger of the identity management system 702. In some implementations, the request includes an ID of the requesting IoT device 704.

The smart contract 710 may access (1104) the permission information 712 that is associated with an owner of the IoT device 704 that is attempting the communication 1002. Based on the permission information 712, a determination is made (1106) whether the requestor (e.g., the requesting IoT device) is permitted to communicate with the particular service 1004, or is permitted to communicate with external services generally. If the requestor is permitted, a determination may be made (1108) whether any constraint(s) on the access are satisfied, such as the constraint(s) that govern the particular requesting IoT device's communications with the particular service 1004. For example, certain IoT device(s) may be permitted to communicate with certain service(s) 1004 (e.g., identified by URI or other network location) but not with other service(s). As another example, an IoT device may be permitted to send certain types of communication to a service 1004 (e.g., requests for information that does not involve a purchase), but may be blocked from sending other types of communications (e.g., purchase transactions).

If it is determined that the requesting IoT device 704 is not permitted to send the communication 1004, or that the constraint(s) on such communications are not satisfied, the communication may be blocked (1110) and not sent to the service 1004. If it is determined that the requesting IoT device is permitted to communicate with the service 1004, and that any constraint(s) on such communications are satisfied, the communication may be allowed (1112) and may be forwarded to the service 1004. In either case (blocked or allowed), the smart contract 710 may update (1116) the request history 718 on the distributed ledger of the identity management system to indicate whether the requested communication 1002 was blocked or allowed.

Figure 12:
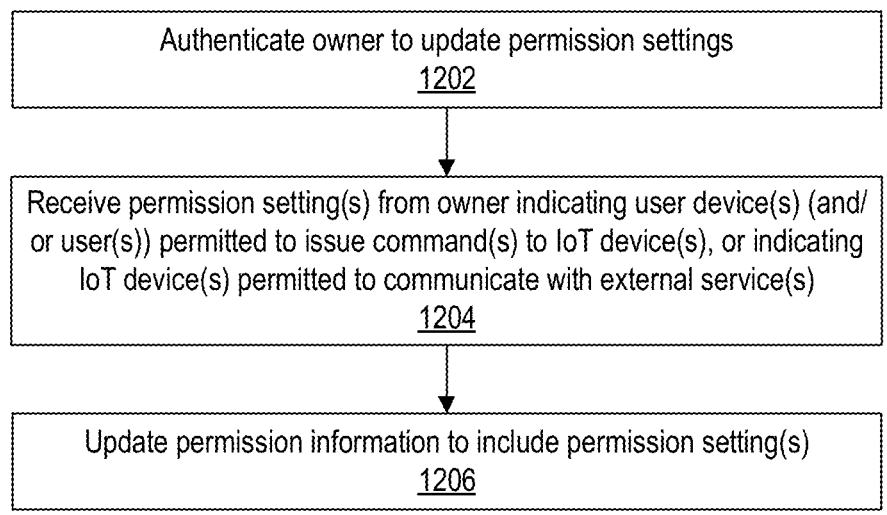
FIG. 12 depicts a flow diagram of an example process for setting permission information for device management, according to implementations of the present disclosure.

FIG. 12 depicts a flow diagram of an example process for setting permission information for device management, according to implementations of the present disclosure. Operations of the process may be performed by one or more of the smart contract(s) 710, the application(s) 716, and/or other software processes executing on the computing device(s) 706, the IoT device(s) 704, the distributed ledger of the identity management system 702, and/or elsewhere.

In some implementations, an owner of a set of IoT device(s) 704 may use the application 716 executing on their computing device 706 to update the permission information 712 governing access to their set of IoT device(s) 704 and/or governing the communications that may be sent from their set of IoT device(s) 704 to external service(s) 1004. In some implementations, the owner may be authenticated (1202) to request such updates, based on credentials provided by the application 716. Such credentials may include a username, password, personal identification number (PIN), biometric information (e.g., fingerprint, facial recognition, voice print identification, etc.), and/or other suitable types of credential(s).

Following successful authentication, the owner may specify permission setting(s) 714 to update the permission information 712, and such permission setting(s) 714 may be received (1204) by the smart contract 710. The smart contract 710 may update (1206) the permission information 712 to include the permission setting(s) 714. Permission setting(s) 714 may specify new user(s) to be given access to IoT device(s) 704, remove previously granted access to certain user(s), update the particular IoT device(s) 704 that user(s) are able to access, and/or update the particular constraint(s) on access to IoT device(s) 704.

In some implementations, the use of a hierarchical deterministic (HD) wallet to organize the IoT devices belonging to the same owner allows device-to-device communication based on ownership. By using an HD wallet to generate and/or organize the addresses assigned to a user's IoT devices, implementations may determine whether two addresses belong to the same wallet, and thus to the one owner. This allows for device-to-device communication (for command and/or control between devices owned by the same user) without the owner explicitly specifying permissions for such communications in the ledger. A user's IoT device system can be set up such that a device automatically accepts transactions from another device if the former can determine that the latter's address belongs to the same HD wallet. For a large IoT device system with many devices, the number of possible device-to-device communication pairings can be large and, if provisioned as permission rules, would take up a significant amount of storage on the blockchain, which is expensive. Implementations can use this particular property of the HD wallet to avoid the need for such storage. For example, a user's car may automatically communicate with the user's garage door opener, which then communicates with several devices customizing the internal home space for that user (e.g., to set temperatures, play music, etc.). Different homeowners can have different customized home settings as appropriate.

Figure 13:
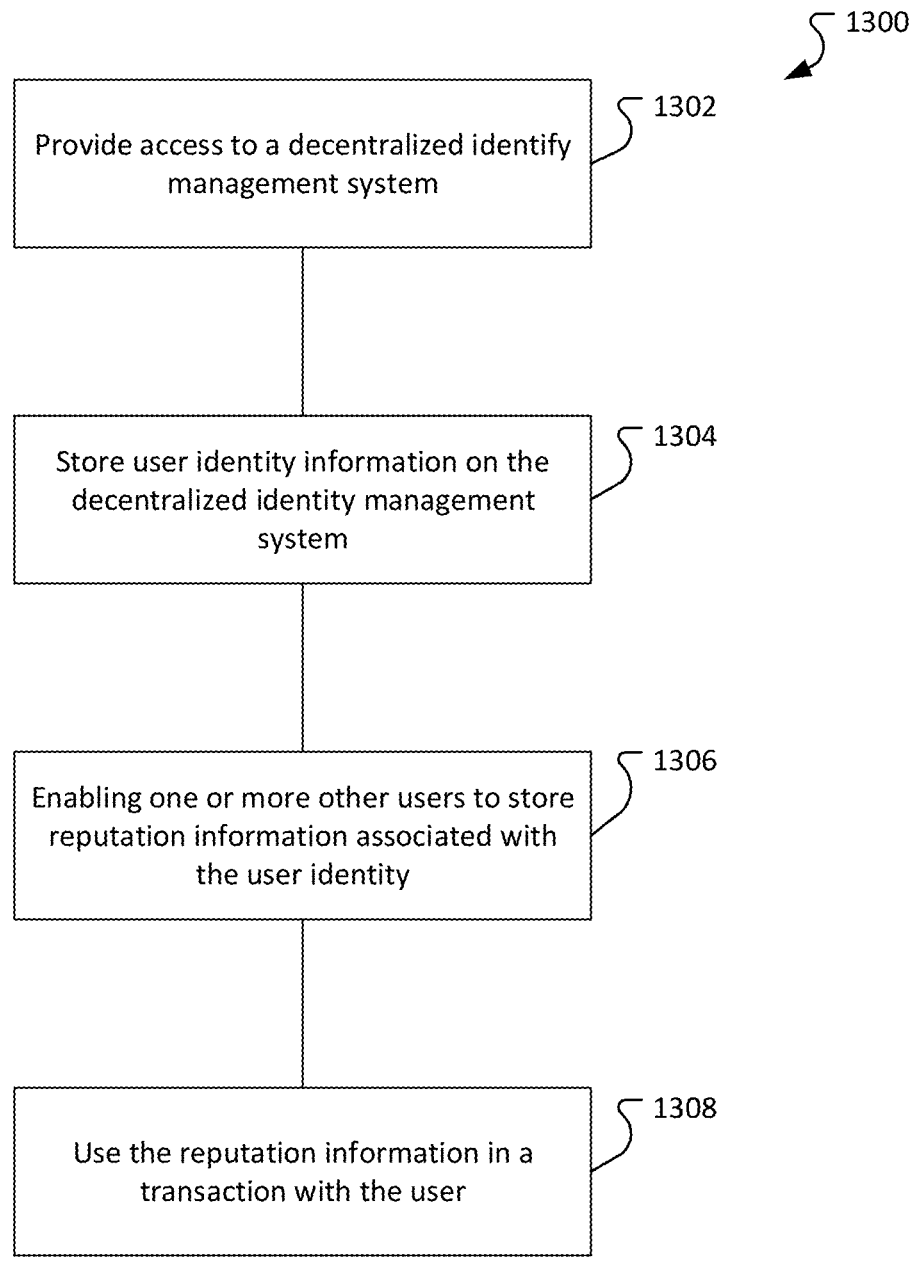
FIG. 13 is a flowchart of an example process for managing identity with a decentralized identity management system.

FIG. 13 is a flowchart of an example process for managing identity with a decentralized identity management system.

The process 1300 provides (1302) access to a decentralized identity management system to a user. The process 1300 may provide access to the decentralized identity management system after authenticating the identity of the user, for example, using a username and password, biometric authentication, and/or multi-factor authentication. In some implementations, the user may be authenticated with a third party that has a predetermined relationship with the identity management system. For example, the user may authenticate with a financial institution, the financial institution may then provide authenticated access to the identity management system.

The process 1300 stores (1304) user identity information on the decentralized identity management system. In some implementations, a user may create an identity on the identity management system. In some implementations, the user's identity may be verified by a third party. For example, a state department of motor vehicles may verify the user's identity and verify that the user possesses a driver's license. Similarly, a State Department may verify the user's identity and verify that the user possesses a passport. In some implementations, the third party will only verify the user's identity based on an in-person interview. For example, the user may present their identification to an official and the official may verify that the user is who they claim to be.

The process 1300 enables (1306) one or more other users to store reputation information associated with the user identity. Information about the user may be added to the user, or made available when someone is attempting to determine information about the user. For example, the user may possess a credit score, a job history, a financial history, diplomas, certifications, etc.

The process 1300 uses (1308) the reputation information in a transaction with the user. The reputation information can be used, for example, to determine whether to extend credit to the user, to trust the user to fulfill an agreement, to offer the user employment, etc.

Figure 14:
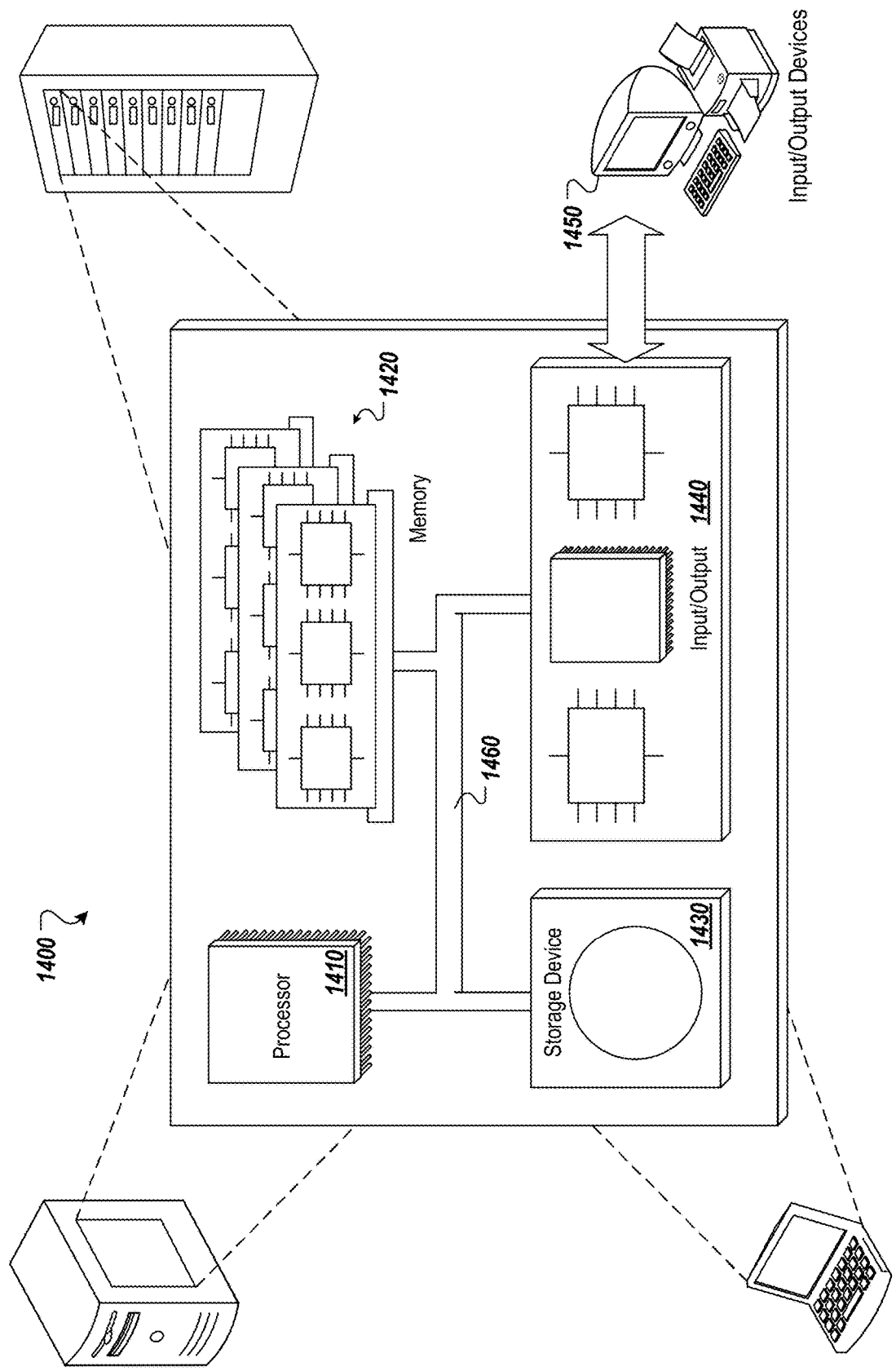
FIG. 14 depicts an example computing system, according to implementations of the present disclosure.

FIG. 14 depicts an example computing system, according to implementations of the present disclosure. The system 1400 may be used for any of the operations described with respect to the various implementations discussed herein. For example, the system 1400 may be included, at least in part, in one or more of the computing device(s) 706, the IoT device(s) 704, and/or other computing device(s) or system(s) described herein. The system 1400 may include one or more processors 1410, a memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

The processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

The memory 1420 may store information within the system 1400. In some implementations, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In some examples, the memory 1420 may be employed as active or physical memory by one or more executing software modules.

The storage device(s) 1430 may be configured to provide (e.g., persistent) mass storage for the system 1400. In some implementations, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In some implementations, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1410 and the memory 1420 may be supplemented by, or incorporated into, one or more application-specific integrated circuits (ASICs).

The system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400 or may be external on one or more computing devices of the system 1400.

The system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-832 standard for serial ports, or with a version of the IEEE AA884 standard for parallel ports. As another example, the I/O interface(s) 1440 may be configured to provide a connection over Universal Serial Bus (USB) or Ethernet. In some examples, the I/O interface(s) 1440 may be configured to provide a serial connection that is compliant with a version of the IEEE AA994 standard.

The I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., as a data server, or that includes a middleware component, e.g., an application server, or that includes a front-end component, e.g., a client computer having a graphical user interface or a web browser through which a user may interact with an implementation, or any appropriate combination of one or more such back-end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
 storing user identity information for a user on a blockchain system of a decentralized identity management system;
 enabling one or more other users to provide reputation information associated with a user identity of the user;
 storing the provided reputation information associated with the user identity of the user on the blockchain system of the decentralized identity management system;
 collecting biometric data from the user using a biometric data collection device;
 providing access to the decentralized identity management system to the user by comparing the collected biometric data with previously collected biometric data to verify the user identity of the user;
 storing a plurality of user identity profiles associated with the user identity of the user on the blockchain system of the decentralized identity management system, wherein each user identity profile of the plurality of user identity profiles comprises specific reputation information associated with the user identity stored on the blockchain system of the decentralized identity management system, and wherein each user identity profile of the plurality of user identity profiles is associated with one or more types of institutions and one or more contexts for requests for information from the one or more types of institutions;
 receiving a request for information relating to a financial transaction involving the user from an institution;
 receiving a selection of a user identity profile of the plurality of user identity profiles to provide to the institution via the decentralized identity management system based on a type of the institution and based on a context of the request for information relating to the user;
 providing the selected user identity profile to the institution; and
 performing the financial transaction between the user and the institution based at least in part on the reputation information included in the selected user identity profile provided to the institution.

2. The computer-implemented method of claim 1, further comprising:
 verifying the user identity of the user including in person verification of the user by a trusted entity; and
 sharing the verified identity of the user with an institution.

3. The computer-implemented method of claim 1, wherein the financial transaction includes determining a period of time between when a check is presented by the user and when funds are made available to the user.

4. The computer-implemented method of claim 3, further comprising storing the user identity of the user, a check identifier, and a time the check was presented for deposit in the blockchain system of the decentralized identity management system for subsequent reference.

5. The computer-implemented method of claim 1, wherein the financial transaction includes:
 receiving a check for deposit;
 determining, based on a record stored in the blockchain system of the decentralized identity management system, whether the check has been previously presented to a financial institution, and
 in response to determining that the check has been previously presented, rejecting or putting a hold on the deposit.

6. The computer-implemented method of claim 1, further comprising:
 storing financial transaction information about the user;
 determining a pattern of normalcy of financial transactions;
 detecting a disruption in the pattern of normalcy; and
 alerting an institution of potential fraud.

7. The computer-implemented method of claim 1, wherein the reputation information includes at least one of degrees earned, a record of military service, and a job history.

8. The computer-implemented method of claim 1, wherein the biometric data comprises data relating to a fingerprint image, data relating to a retinal image, data relating to an image of the user's face or other body portion, data relating to a voice print pattern, data describing a heartbeat of the user, data describing a pulse of the user, data describing brainwave activity of the user, data describing a galvanic skin response of the user, data describing a body tremor of the user, data describing a gait of the user, data describing an electrical impedance of the user, or some combination thereof.

9. A decentralized identity management system, comprising:
 a blockchain system configured to store data relating to reputation information and user profiles of users associated with the reputation information;
 a biometric collection device configured to collect biometric data;
 at least one processor; and
 a memory communicatively coupled to the at least one processor, the memory storing instructions which, when executed by the at least one processor, cause the at least one processor to perform operations comprising:
  storing user identity information for a user on the blockchain system of the decentralized identity management system;
  enabling one or more other users to provide reputation information associated with a user identity of the user;
  storing the provided reputation information associated with the user identity of the user on the blockchain system of the decentralized identity management system;
  collecting biometric data from the user using a biometric data collection device;
  providing access to the decentralized identity management system to the user by comparing the collected biometric data with previously collected biometric data to verify the user identity of the user;
  storing a plurality of user identity profiles associated with the user identity of the user on the blockchain system of the decentralized identity management system, wherein each user identity profile of the plurality of user identity profiles comprises specific reputation information associated with the user identity stored on the blockchain system of the decentralized identity management system, and wherein each user identity profile of the plurality of user identity profiles is associated with one or more types of institutions and one or more contexts for requests for information from the one or more types of institutions;

receiving a request for information relating to a financial transaction involving the user from an institution;

receiving a selection of a user identity profile of the plurality of user identity profiles to provide to the institution via the decentralized identity management system based on a type of the institution and based on a context of the request for information relating to the user;

providing the selected user identity profile to the institution; and performing the financial transaction between the user and the institution based at least in part on the reputation information included in the selected user identity profile provided to the institution.

10. The decentralized identity management system of claim 9, further comprising:
verifying the user identity of the user including in person verification of the user by a trusted entity; and
sharing the verified identity of the user with an institution.

11. The decentralized identity management system of claim 9, wherein the financial transaction includes determining a period of time between when a check is presented by the user and when funds are made available to the user.

12. The decentralized identity management system of claim 11, wherein the financial transaction further includes:
storing the user identity of the user, a check identifier, and a time the check was presented for deposit in the blockchain system of the decentralized identity management system for subsequent reference.

13. The decentralized identity management system of claim 9, wherein the financial transaction includes:
receiving a check for deposit;
determining, based on a record stored in the blockchain system of the decentralized identity management system, whether the check has been previously presented to a financial institution, and
in response to determining that the check has been previously presented, rejecting or putting a hold on the deposit.

14. The decentralized identity management system of claim 9, further comprising:
storing financial transaction information about the user;
determining a pattern of normalcy of financial transactions;
detecting a disruption in the pattern of normalcy; and
alerting an institution of potential fraud.

15. The decentralized identity management system of claim 9, wherein the reputation information includes at least one of degrees earned, a record of military service, and a job history.

16. The decentralized identity management system of claim 9, wherein the biometric data comprises data relating to a fingerprint image, data relating to a retinal image, data relating to an image of the user's face or other body portion, data relating to a voice print pattern, data describing a heartbeat of the user, data describing a pulse of the user, data describing brainwave activity of the user, data describing a galvanic skin response of the user, data describing a body tremor of the user, data describing a gait of the user, data describing an electrical impedance of the user, or some combination thereof.

17. A non-transitory computer-readable storage media storing instructions which, when executed by at least one processor, cause the at least one processor to perform operations comprising:
storing user identity information for a user on a blockchain system of a decentralized identity management system;
enabling one or more other users to provide reputation information associated with a user identity of the user;
storing the provided reputation information associated with the user identity of the user on the blockchain system of the decentralized identity management system;
collecting biometric data from the user using a biometric data collection device;
providing access to the decentralized identity management system to the user by comparing the collected biometric data with previously collected biometric data to verify the user identity of the user;
storing a plurality of user identity profiles associated with the user identity of the user on the blockchain system of the decentralized identity management system, wherein each user identity profile of the plurality of user identity profiles comprises specific reputation information associated with the user identity stored on the blockchain system of the decentralized identity management system, and wherein each user identity profile of the plurality of user identity profiles is associated with one or more types of institutions and one or more contexts for requests for information from the one or more types of institutions;
receiving a request for information relating to a financial transaction involving the user from an institution;
receiving a selection of a user identity profile of the plurality of user identity profiles to provide to the institution via the decentralized identity management system based on a type of the institution and based on a context of the request for information relating to the user;
providing the selected user identity profile to the institution; and
performing the financial transaction between the user and the institution based at least in part on the reputation information included in the selected user identity profile provided to the institution.

18. The non-transitory computer readable storage media of claim 17, further comprising:
verifying the user identity of the user including in person verification of the user by a trusted entity; and
sharing the verified identity of the user with an institution.

19. The non-transitory computer readable storage media of claim 17, wherein the financial transaction includes determining a period of time between when a check is presented by the user and when funds are made available to the user.

20. The non-transitory computer readable storage media of claim 17, wherein the biometric data comprises data relating to a fingerprint image, data relating to a retinal image, data relating to an image of the user's face or other body portion, data relating to a voice print pattern, data describing a heartbeat of the user, data describing a pulse of the user, data describing brainwave activity of the user, data describing a galvanic skin response of the user, data describing a body tremor of the user, data describing a gait of the user, data describing an electrical impedance of the user, or some combination thereof.

* * * * *